United States Patent
Sakamoto (10) Patent No.: US 8,213,805 B2
(45) Date of Patent: Jul. 3, 2012

(54) OPTICAL COMMUNICATION SYSTEM, METHOD OF MEASURING OPTICAL TRANSMISSION LINE IN THE OPTICAL COMMUNICATION SYSTEM, TRANSMITTING STATION, AND RECEIVING STATION

(75) Inventor: Takeshi Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 539 days.

(21) Appl. No.: 12/413,555

(22) Filed: Mar. 28, 2009

(65) Prior Publication Data

US 2009/0245786 A1    Oct. 1, 2009

(30) Foreign Application Priority Data

Mar. 28, 2008    (JP) .................. 2008-085778

(51) Int. Cl.
*H04B 10/00* (2006.01)
*H04B 10/08* (2006.01)
(52) U.S. Cl. ................ 398/177; 398/15; 398/160
(58) Field of Classification Search .............. 398/15, 398/28, 33, 37, 157, 160, 177
See application file for complete search history.

(56) References Cited

U.S. PATENT DOCUMENTS

| | | | |
|---|---|---|---|
| 5,793,481 A | 8/1998 | Leali | |
| 7,409,155 B2 | 8/2008 | Takahashi | |
| 7,440,164 B2 * | 10/2008 | Eiselt | 359/334 |
| 7,580,634 B2 | 8/2009 | Takeuchi et al. | |
| 2005/0041968 A1 | 2/2005 | Takahashi | |
| 2005/0111843 A1 | 5/2005 | Takeuchi et al. | |
| 2006/0164716 A1* | 7/2006 | Leplingard et al. | 359/334 |
| 2007/0217794 A1 | 9/2007 | Sakamoto et al. | |
| 2009/0279897 A1 | 11/2009 | Takeuchi et al. | |

FOREIGN PATENT DOCUMENTS

| | | |
|---|---|---|
| JP | 59-110236 | 6/1984 |
| JP | 11-511620 | 10/1999 |
| JP | 2005-072769 | 3/2005 |
| JP | 2005-136510 | 5/2005 |
| JP | 2007-251683 | 9/2007 |

OTHER PUBLICATIONS

Japanese Office Action mailed May 8, 2012 for corresponding Japanese Application No. 2008-085778, with English-language translation.

* cited by examiner

*Primary Examiner* — Dawayne A Pinkney
(74) *Attorney, Agent, or Firm* — Fujitsu Patent Center (57) ABSTRACT

According to halt of a Raman pumping light source, a transmitting light power of a first light which is subject to receive a Raman gain is controlled to increase. In this state, a first input/output light power for a first light of an optical transmission line is measured, the first input/output light power being used for determining a reference of loss characteristic of the optical transmission line. A second input/output light power for a second light of the optical transmission line is measured, the second light not being subject to receive the Raman gain, the second input/output light power being used for determining a fluctuation of the reference.

18 Claims, 6 Drawing Sheets

OPTICAL COMMUNICATION SYSTEM, METHOD OF MEASURING OPTICAL TRANSMISSION LINE IN THE OPTICAL COMMUNICATION SYSTEM, TRANSMITTING STATION, AND RECEIVING STATION

CROSS-REFERENCE TO RELATED APPLICATION(S)

This application is based upon and claims the benefit of priority of the prior Japanese Application No. 2008-085778 filed on Mar. 28, 2008 in Japan, the entire contents of which are hereby incorporated by reference.

FIELD

The embodiment(s) discussed herein is directed to an optical communication system, a method of measuring an optical transmission line in the optical communication system, a transmitting station, and a receiving station. The embodiment(s) may be applied to, for example, an optical communication system using a Raman amplifier.

BACKGROUND

In recent years, in an optical transmission apparatus such as a terminal station or a relay station, in order to achieve improvement of operability of an operator or automation of setting, a function of automatically measuring and displaying a loss (span loss) of an optical transmission line of a transmission section (span) to another optical transmission apparatus is required.

The span loss measuring function has a function of notifying an operator of a fluctuation in span loss by an external factor during an operation. In a start-up period, the span loss measuring function may be used to check whether a theoretical span loss in a network design phase is matched with an actual span loss or whether an optical level conforms to an input/output specification of the optical transmission apparatus.

Examples of the method of measuring a span loss include a method of arranging photodiodes (PD) in a transmitting station and a receiving station and determining a difference between an optical output level of the transmitting station and an optical input level of the receiving station to measure a span loss.

A measuring method which considers span loss measurement without wavelength dependency of a span loss or signal light is also known. In this measuring method, in a start-up period of an optical communication system, by using amplified spontaneous emission (ASE) light and optical supervisory channel (OSC, monitor control) light, reference span losses based on the ASE light and the OSC light are measured. During an operation of the optical communication system, a difference (fluctuation in span loss) with the OSC reference span loss determined by using the OSC light is added to the ASE reference span loss.

Patent Document 1: Japanese Patent Application Laid-Open No. 2007-251683

In an optical communication system such as a wavelength-division multiplexing system (to be referred to as a WDM system hereinafter), in addition to an optical fiber amplifier such as an erbium doped fiber amplifier (EDFA), a distributed Raman amplifier (DRA) which supplementarily amplifies a WDM light by using a stimulated Raman scattering phenomenon on an optical transmission line may be used.

However, the conventional art described above merely refers to a method of measuring a span loss in an optical communication system in which a DRA is not used.

SUMMARY

For example, exemplary embodiment(s) uses the following.

According to an aspect of the embodiment, an optical communication system includes: a Raman amplifier that gives a Raman gain to an optical transmission line; a transmitting unit operable to transmit to the optical transmission line, a first light being subject to receive the Raman gain through the optical transmission line and a second light not being subject to receive the Raman gain through the optical transmission line; a control unit operable to halt the Raman amplifier and control a transmission light power of the first light so as to increase the power according to the Raman gain; a first measuring unit operable to measure a first input-output light power for the first light of the optical transmission line, the first input-output light power being used for determining a reference of loss characteristic of the optical transmission line, during the Raman amplifier being halted; and a second measuring unit operable to measure a second input-output light power for the second light of the optical transmission line, the second input-output light power being used for determining a fluctuation of the reference.

According to an aspect of the embodiment, a method of measuring an optical transmission line in an optical communication system having a Raman amplifier that gives a Raman gain to an optical transmission line, the method includes: transmitting to the optical transmission line, a first light being subject to receive the Raman gain through the optical transmission line and a second light not being subject to receive the Raman gain through the optical transmission line; halting the Raman amplifier and controlling a transmission light power of the first light so as to increase the power according to the Raman gain; measuring a first input-output light power for the first light of the optical transmission line, the first input-output light power being used for determining a reference of loss characteristic of the optical transmission line, during the Raman amplifier being halted; measuring a second input-output light power for the second light of the optical transmission line, the second input-output light power being used for determining a fluctuation of the reference.

According to an aspect of the embodiment, a transmitting station in an optical communication system that transmits a light from an optical transmission apparatus serving as the transmitting station to an optical transmission apparatus serving as a receiving station through an optical transmission line, the transmitting station includes: a transmitting unit operable to transmit to the optical transmission line, a first light being subject to receive the Raman gain through the optical transmission line and a second light not being subject to receive the Raman gain through the optical transmission line; a control unit operable to control a transmission light power of the first light so as to increase the power according to the Raman gain with the Raman amplifier being controlled to halt; a first transmitted light measuring unit operable to measure a first input light power for the first light of the optical transmission line, the first input light power being used for determining a reference of loss characteristic of the optical transmission line, during the Raman amplifier being halted; a second transmitted light measuring unit operable to measure a second input light power for the second light of the optical transmission line, the second input light power being used for determining a fluctuation of the reference; and a notifying unit operable to notify the receiving station of measurement results obtained by each of the transmitted light measuring units.

According to an aspect of the embodiment, a receiving station in an optical communication system that transmits a light from an optical transmission apparatus serving as a transmitting station to an optical transmission apparatus serving as the receiving station through an optical transmission line, the receiving station includes: a Raman amplifier that gives a Raman gain to the optical transmission line; a control unit operable to control the Raman amplifier to halt; a receiving unit operable to receive from the optical transmission line, a first light being subject to receive the Raman gain through the optical transmission line and a second light not being subject to receive the Raman gain through the optical transmission line; a first received light measuring unit operable to measure a first output light power for the first light of the optical transmission line, the first output light power being used for determining a reference of loss characteristic of the optical transmission line, during the output light power of the first light being controlled so as to increase with the halt control and the Raman amplifier being halted; and a second received light measuring unit operable to measure a second output light power for the second light of the optical transmission line, the second output light power being used for determining a fluctuation of the reference.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS

Hereinafter, exemplary embodiments will be described below with reference to the accompanying drawings. The embodiments described later are only exemplification, and it is not intended to exclude various modifications or application of techniques which are described below. In other words, various modifications (combinations of the embodiments and the like) can be implemented without departing from the spirits and scopes of the proposed system, method, and/or, apparatus.

[1] Embodiment

The present embodiment discloses a method of reducing a measurement error caused by giving a gain to a signal light or a monitoring control light through the DRA when loss (span loss) characteristic of an optical transmission line in an optical transmission section (span) between terminal stations and relay stations in an optical communication system such as a WDM system using a DRA.

Since the loss of the optical transmission line depends on wavelengths, as a span loss, a central wavelength of a wavelength band of a signal transmitted through the optical transmission line is preferably measured. While the system does not operate, an ASE light can be used to measure a span loss of a wavelength corresponding to the central wavelength. Therefore, while the system does not operate, for example, in a system start-up period, a span loss serving as a reference about the central wavelength is measured by using the ASE light.

In this measurement, when the DRA does not halt, a measurement error may occur due to a gain (Raman gain) of the DRA. Therefore, in measurement of a reference span loss by the ASE light, the DRA is preferably controlled to halt. In the embodiment, the halt control of the DRA includes not only halting of the drive of the Raman pumping light source but also control to decrease a Raman pumping light power to a level at which a measurement error of the span loss does not substantially occur.

However, when the DRA is halted, the ASE light does not reach a receiving station first of all. Even if the ASE light reaches the receiving station, a receiving light level is so low that the receiving light level cannot be accurately measured. Therefore, depending on the Raman halt control, in a transmitting station which transmits an ASE light, a transmitting light power level of the ASE light is preferably controlled (set) to a power level (high-output mode) enough for measurement in the receiving station.

The transmitting light power level in the high-output mode can be determined based on information (may be generally referred to as DRA information hereinafter) for a gain (for example, the maximum gain) of the DRA. In this case, the transmitting light power level is preferably determined in a range that does not exceed an upper limit of an input light power level of the receiving station. For example, if a decrease in gain caused by halting the DRA is 7 dB, the transmitting light power level of the ASE light may be controlled to increase by 7 dB in the high-output mode.

On the other hand, during a system operation, a fluctuation in span loss is measured by using a light of a wavelength out of the wavelength band of the signal light. As a wavelength used in measurement of the fluctuation, a wavelength of an OSC can also be selected as in the conventional art. However, the wavelength may be amplified by a Raman gain.

Figure 1:
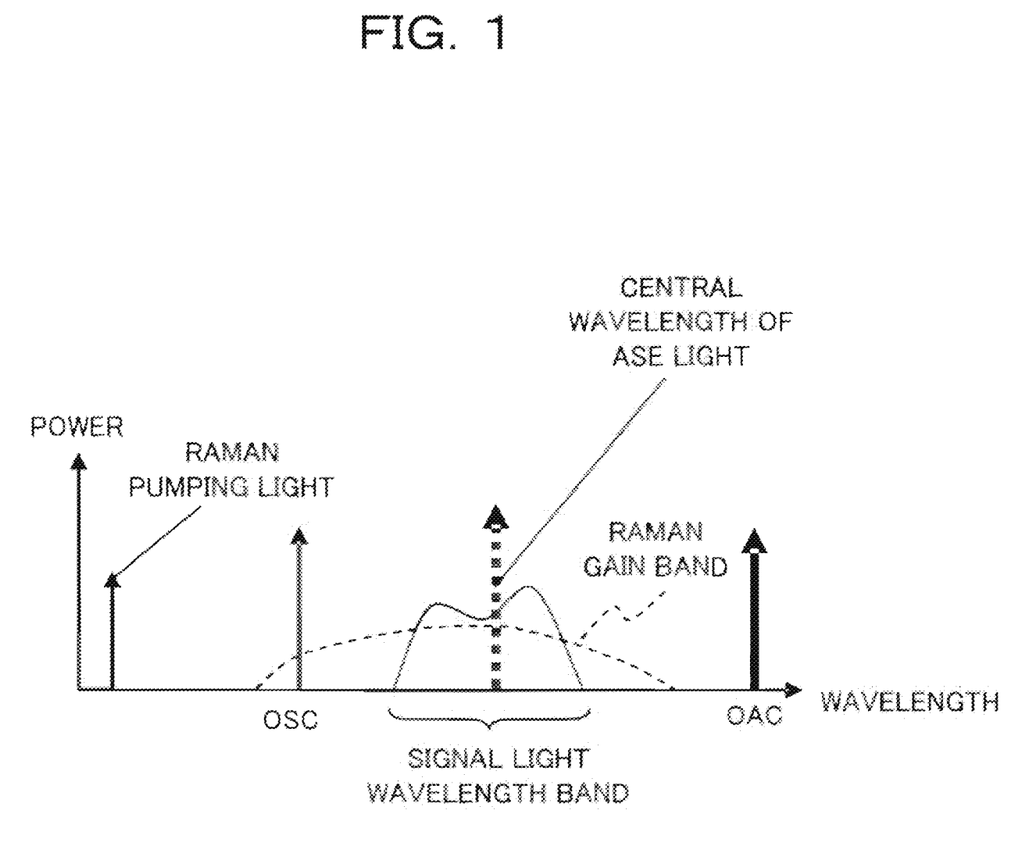
FIG. 1 is a graph exemplifying relationships between signal light wavelength band, a Raman pumping light, an OSC, and an OAC.

It is known that a Raman gain appears around at the wavelength shifted to a long wavelength side by about 100 nm (nanometer) from the wavelength of a Raman pumping light. For this reason, as exemplified in FIG. 1, when, as a wavelength of an OSC signal, a wavelength being on a long wavelength side from the wavelength of the Raman pumping light and on a short wavelength side of a signal light wavelength band is selected, the OSC signal light may be included in the Raman gain band and amplified by a Raman gain. In FIG. 1, for example, the wavelength of the Raman pumping light is 1440 nm, a signal light wavelength band ranges from 1530 to 1560 nm, and an OSC wavelength is 1510 nm.

When a wavelength out of the Raman gain band is selected as a wavelength used for measuring a fluctuation of the span loss, the fluctuation can be accurately measured without being influenced by the Raman gain.

In this case, on a high wavelength side of the signal light wavelength band, as exemplified in FIG. 1, a signal light (gain reference light) of a wavelength (Optical Auxiliary Channel (OAC)) used for notifying a transmitting station of a Raman gain in a receiving station may be wavelength-multiplexed. In this case, the fluctuation can be measured by using the OAC signal light. The OAC wavelength is, for example, 1610 nm.

An example of an optical communication system which can execute the span loss measuring method of the embodiment will be described below in detail.

[2] First Embodiment

Figure 2:
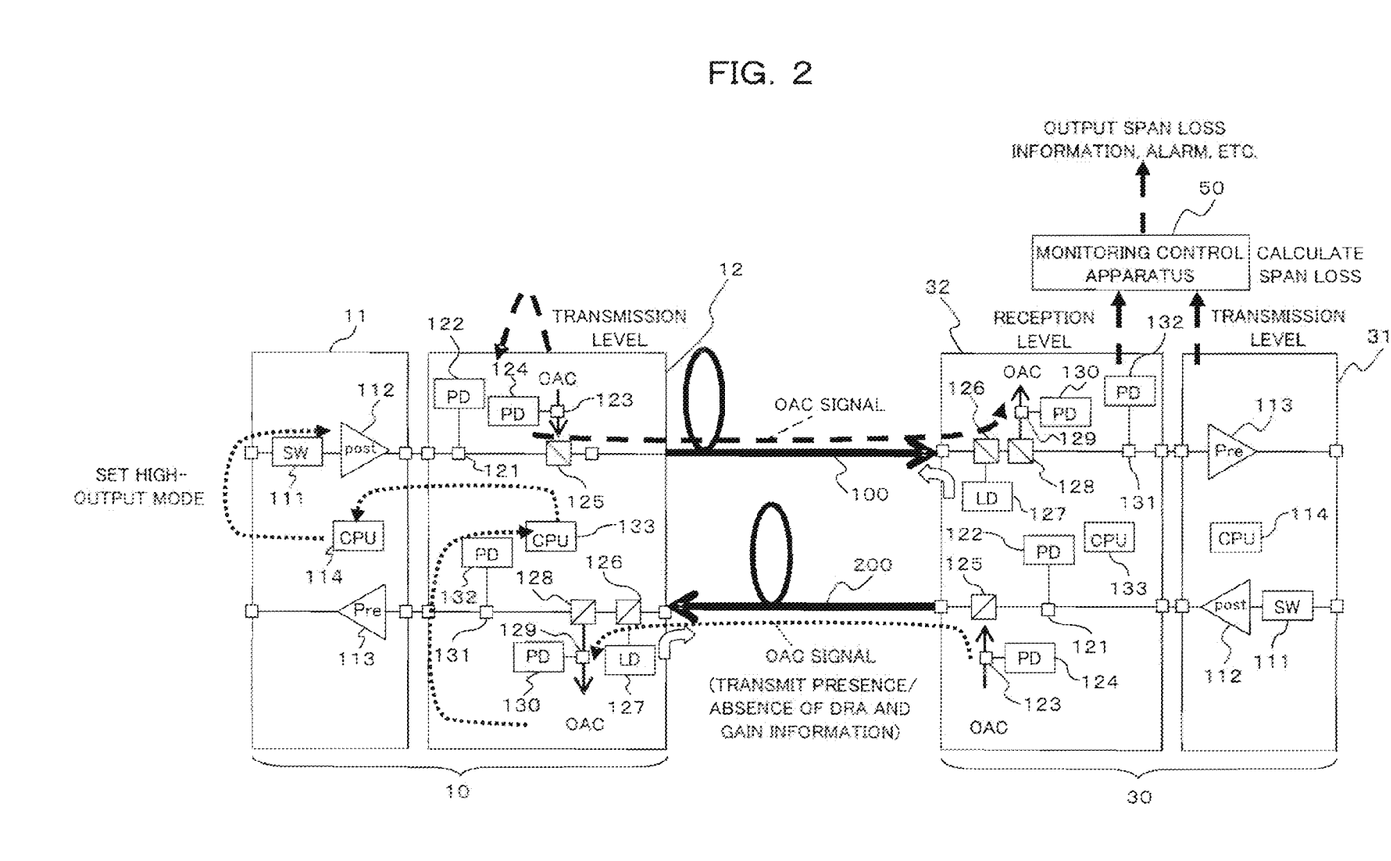
FIG. 2 is a block diagram showing an example of an optical communication system according to a first embodiment.

FIG. 2 is a block diagram showing an example of the optical communication system according to a first embodiment. The optical communication system illustrated in FIG. 2 includes an optical transmission apparatus 10, an optical transmission apparatus 30, and a monitoring control apparatus 50. The optical transmission apparatus 10 and the optical transmission apparatus 30 are connected by optical transmission lines 100 and 200, thereby enabling two-way communication.

More specifically, the optical transmission apparatus 10 can transmit a signal light to the optical transmission apparatus 30 through the optical transmission line 100, and the optical transmission apparatus 30 can transmit a signal light to the optical transmission apparatus 10 through the optical transmission line 200.

Therefore, the optical transmission apparatus 10 is a transmitting station that transmits a signal light to the optical transmission line 100 and a receiving station that receives a signal light from the optical transmission line 200. Similarly, the opposing optical transmission apparatus 30 is a transmitting station that transmits a signal light to the optical transmission line 200 and a receiving station that receives a signal light from the optical transmission line 100. Each of the optical transmission apparatuses 10 and 30 is a terminal station or a relay station.

The signal light is a main signal light on which a user data signal is superposed or a signal light of an OSC, an OAC, or the like other than the main signal light. The main signal light is a signal light of a single wavelength or a WDM signal light wavelength-multiplexed.

As a transmitting station, the optical transmission apparatus 10 (30) includes, as an example of a transmitting system, an optical switch unit 111, an optical amplifier (post-amplifier) 112, optical couplers (splitting couplers) 121 and 123, photodiodes (PDs) 122 and 124 serving as example of a light-receiver, and an optical coupler (optical multiplexing) 125.

On the other hand, as a receiving station, the optical transmission apparatus 30 (10) includes, as examples of the receiving system, an optical coupler (optical multiplexer) 126, a Raman pumping light source (LD) 127, an optical coupler (splitting coupler) 128, and an optical coupler (splitting coupler) 129, PDs 130 and 132 serving as an example of a light-receiver, an optical coupler (splitting coupler) 131, and an optical amplifier (preamplifier) 113.

The optical transmission apparatuses 10 and 30 each includes a CPU 114 and a CPU 133 serving as examples of control systems (control units) that control the transmitting system and the receiving system.

FIG. 2 illustrates a manner of forming modules of optical devices and CPUs in units of functions of an EDFA and a DRA. Illustratively, it is assumed that the optical switch unit 111, the post-amplifier 112, the preamplifier 113, and the CPU 114 are included in an EDFA module 11 (31) and that the splitting couplers 121, 123, 128, and 131, the PDs 122, 124, 130, and 132, the Raman pumping light source (LD) 127, and the optical multiplexer 125 and 126 are included in a DRA module 12 (32).

The modules 11 and 12 (31 and 32) are connected to each other by an optical fiber or the like. In the transmitting system, a line extending from an input terminal of the EDFA module 11 (31) to the optical transmission line 100 (200) through the DRA module 12 (32) is an optical line. Similarly, in the receiving system of the optical transmission apparatus 30 (10), a line extending from the optical transmission line 200 (100) to an output terminal of the EDFA module 31 (11) through the DRA module 32 (12) is also an optical line.

Details of the transmitting system, the receiving system, and the control system will be described later.

(2.1) Transmitting System

In the EDFA module 11 (31), the optical switch unit 111 transmits an input light (signal light) to the post-amplifier 112 or interrupts the input light (ON/OFF). This ON/OFF operation is controlled by, for example, the CPU 114. Illustratively, control in an ON state is performed in a normal system operation state, and control in an OFF state is performed in a non-system operation state such as a span loss measuring mode. An input light to the post-amplifier 112 may be a signal light of a single wavelength, or may be a WDM signal light wavelength-multiplexed.

The post-amplifier 112 is an optical fiber amplifier such as an EDFA. The post-amplifier 112 amplifies a signal light (transmitting signal light to the receiving station 30 (10)) input when the optical switch unit 111 is in an ON state by using a pumping light power. When the optical switch unit 111 is in an OFF state, the post-amplifier 112 amplifies a pumping light without an input of a signal light to set a light-emitting state of an ASE light.

In the DRA module 12 (32), the splitting coupler 121 splits an output light (power) from the post-amplifier 112 to output one of the split output lights to the PD 122 as a monitor light and to output the other to the optical coupler 125 as a signal light to be transmitted to the optical transmission apparatus 30 (10) serving as a receiving station through the optical transmission line 100 (200).

The PD 122 (first transmitting light measuring unit) photoelectrically converts a light (first light) input from the splitting coupler 121 to generate an electric signal (analog signal) according to a light-receiving power of the input light. The analog signal is converted into a digital signal by an AD converter (not illustrated). The digital signal is given to the CPU 133 as a signal light output power level of the post-amplifier 112, i.e., a monitor value (measured value) of an input power level of a signal light (or an ASE light) transmitted from the optical transmission apparatus 10 (30) to the optical transmission line 100 (200).

The optical multiplexer 125 multiplexes the OAC signal light serving as an example of a signal light of a wavelength which is not subject to receive a Raman gain to an output light of the post-amplifier 112 input from the splitting coupler 121, i.e., to a transmitting signal light to the optical transmission apparatus 30 (10) serving as a receiving station. In FIG. 2, a light source, an optical modulator, and the like for the OAC signal light are omitted.

More specifically, the optical switch unit 111, the post-amplifier 112, and the optical multiplexer 125 are used as examples of transmitting units that transmit an ASE light (may be a signal light) which is subject to receive a Raman gain through the optical transmission line 100 (200) and an OAC signal light which is not subject to receive a Raman gain to the optical transmission line 100 (200).

The splitting coupler 123 partially splits the OAC signal light (power) to output the split signal outputs to the PD 124 as monitor lights of transmitting OAC signal light powers.

The PD (second transmitting light measuring unit) 124 photoelectrically converts a monitor light of an OAC signal light (second light) input from the splitting coupler 123 to generate an electric signal (analog signal) according to the light-receiving power. This analog signal is also converted into a digital signal by an AD converter (not shown), and the digital signal is given to the CPU 133 as a monitor value (measured value) of a transmitting OAC signal light power level to the optical transmission line 100 (200).

(2.2) Receiving System

In the DRA module 32 (12), the optical multiplexer 126 brings a Raman pumping light generated by the Raman pumping light source (LD) 127 to the optical transmission line 100 (200) to the optical transmission apparatus 10 (30) serving as a receiving station so as to cause the optical transmission line 100 (200) to generate a Raman gain.

The splitting coupler 128 splits the OAC signal light received through the optical transmission line 100 (200) and transmitted by the optical transmission apparatus 10 (30) serving as a transmitting station to output the split signal lights to the splitting coupler 129. A signal light other than the OAC signal light is output to the preamplifier 113 (splitting coupler 131).

The splitting coupler 129 partially splits an OAC signal light (power) input from the splitting coupler 128 to input the split signal lights to the PD 130 as a monitor light of a receiving OAC signal light power level.

The PD (second receiving light measuring unit) 130 photoelectrically converts the monitor light to generate an electric signal (analog signal) according to the light-receiving power. An AD converter (not illustrated) also converts the analog signal into a digital signal and gives the digital signal to the CPU 133 as a monitor value (measured value) of the receiving OAC signal output power level from the optical transmission line 100 (200).

The splitting coupler 131 partially splits a signal light (power) other than the OAC signal light input from the splitting coupler 128 and inputs the split signal lights to the PD 130 as a receiving signal light power from the optical transmission apparatus 10 (30) serving as a transmitting station.

The PD 132 (first receiving light measuring unit) photoelectrically converts the monitor light to generate an electric signal (analog signal) according to the light-receiving power. An AD converter (not illustrated) also converts the analog signal into a digital signal and gives the digital signal to the CPU 133 as a monitor value (measured value) of an input power level of a signal light (or an ASE light) from the optical transmission line 100 (200).

In the EDFA module 31 (11), the preamplifier 113 also operates as an optical fiber amplifier such as an EDFA. The preamplifier 113 amplifies a signal light received from the optical transmission apparatus 10 (30) serving as a transmitting station through the optical transmission line 200 (100) by using a pumping light power.

More specifically, the splitting coupler 128 and the splitting coupler 131 are used as examples of receiving units that receive an ASE light (or signal light) which is subject to receive a Raman gain through the optical transmission line 100 (200) and an OAC signal light which is not subject to receive a Raman gain through the optical transmission line 100 (200) from the optical transmission apparatus 10 (30).

As described above, in the optical transmission apparatus 10 (30) serving as a transmitting station, a transmitting signal light (ASE light) output power level can be measured by the PD 122, and a transmitting OAC signal light power level can be measured by the PD 124. In the optical transmission apparatus 30 (10) serving as a receiving station, a receiving signal light (ASE light) input power level can be measured by the PD 132, and a receiving OAC signal light power level can be measured by the PD 130.

More specifically, the PD 122 on the transmission side and the PD 132 on the reception side are used as examples of first measuring units that measure an input/output power level of the optical transmission line 100 (200) for an ASE light (or a signal light) serving as an example of a first light which is subject to receive a Raman gain through the optical transmission line 100 (200).

The PD 124 on the transmission side and the PD 130 on the reception side are used as examples of second measuring units that measure an input/output power level of the optical transmission line 100 (200) for an OAC signal light serving as an example of a second light which is not subject to receive a Raman gain through the optical transmission line 100 (200).

These measurement results are finally used to monitor (determine) loss characteristic (span loss) of the optical transmission line 100 (200) in the monitoring control apparatus 50.

A point (PD 122) to measure a transmitting signal light output power level and a point (PD 132) to measure a receiving signal light input power level may be set in the EDFA module 11 (31). However, in order to remove or reduce an influence of a fiber loss between the EDFA module 11 (31) and the DRA module 12 (32), as exemplified in FIG. 2, the points are preferably set in the DRA module 12 (32).

Power levels (monitor values) measured by using the PDs 122, 124, 130, and 132 can be converted into light power levels at input/output terminals of the optical transmission line 100 (200) by measuring and adding or subtracting losses between the PDs and the optical transmission line 100 (200) to or from monitor values of the PDs as differences. In this manner, an accurate span loss can be measured.

(2.3) Control System

The CPU 114 of the EDFA module 11 (31) ON/OFF-controls the optical switch unit 111 and controls a pumping light power (gain) of the post-amplifier 112 and the preamplifier 113.

The CPU 133 of the DRA module 12 (32) performs generation of an OAC signal (frame) superposed on an OAC signal light, control of an output light power (Raman pumping light power) of the Raman pumping light source 127, control depending on the contents of a receiving OAC signal, and the like.

The CPUs 114 and 133 can communicate (inter-CPU communication) with each other. Illustratively, the CPU 133 of the receiving station 30 (10) generates information to notify the transmitting station 10 (30) of a measurement start (span loss measurement mode request) of a reference span loss when the CPU 133 measures a reference span loss between the CPU 133 and the transmitting station 10 (30) in a start-up period. Accordingly, the CPU 133 halts (or controls an output power to decrease the power) the Raman pumping light source (LD) 127 that transmits a Raman pumping light to the optical transmission line 100 (200) serving as a span loss measurement target.

In the span loss measurement mode request, for example, information about the presence/absence of a DRA (Raman pumping light to the optical transmission line 100 (200)) of the receiving station 30 (10) and DRA information such as information about a gain of the DRA can be included. The transmitting station 10 (30) (for example, the CPU 133) can determine whether a setting of the high-output mode is preferable based on the information of the former, and can recognize an output power level of an ASE light preferable in the high-output mode based on the information of the latter.

The span loss measurement mode request, for example, can be transmitted as a signal light of an OAC (or OSC) to the transmitting station 10 (30) through the opposing optical transmission line 200 (100). The OAC signal light may reach the transmitting station 10 (30) even when the Raman pumping light source 127 of the facing transmitting station 10 (30) is not driven. However, in consideration of the situation in which the OAC signal light does not reach the transmitting station 10 (30), the Raman pumping light source 127 of the facing transmitting station 10 (30) may be driven.

On the other hand, the CPU 133 of the transmitting station 10 (30) OFF-controls the optical switch unit 111 in cooperation with the CPU 114 when the contents of the OAC (or OSC) received from the facing receiving station 30 (10) include the span loss measurement mode request. The CPU 133 checks whether a DRA is mounted on the transmitting station 10 (30) based on the DRA information notified by the OAC signal light. When it is confirmed that the DRA is mounted, the CPU 133 controls (sets) the post-amplifier 112 to a high-output mode based on the DRA information (information about a Raman gain). An output light power level in the high-output mode, as described above, is a power level at which a receiving-light power level of an ASE light (or signal light) can be measured by the receiving station 30 (10).

As illustrated in FIG. 2, in a system in which a specification of a two-way DRA is determined with respect to a two-way optical communication, the DRA information can also be estimated from mounting information of the DRA about the optical transmission line 200 (100) which is a line facing the station 10 (30). This applies also in the following description.

The CPU 133 of the transmitting station 10 (30) also functions as a notifying unit that notifies the receiving station 30 (10) of measured values (monitor values) obtained by the PDs 122 and 124. For example, in measurement of a reference span loss in a start-up period or the like, the receiving station 30 (10) are notified of measured values (transmitting power levels of the ASE and the OAC) obtained by the PDs 122 and 124. When a fluctuation of the reference span loss is to be measured (after a normal operation is started), the receiving station 30 (10) is notified of the measured value (transmitting light power level of the OAC) obtained by the PD 124. The notifications can be performed by the OAC signal lights.

On the other hand, the CPU 133 of the receiving station 30 (10) also functions as a measurement result notifying unit that notifies the monitoring control apparatus 50 of measurement results (monitor values) obtained by the PD 130 and 132. For example, when a reference span loss is measured in a start-up period or the like, the monitoring control apparatus 50 is notified of measured values (receiving light power levels of the ASE and OAC) obtained by the PD 130 and the PD 132. When a fluctuation of the reference span loss is to be measured (after a normal operation is started), the monitoring control apparatus 50 is notified of the measured value (receiving light power level of the OAC) obtained by the PD 130.

The CPU 133 serving as an example of the measurement result notifying unit notifies the monitoring control apparatus 50 of values which are measured by the PDs 122 and 124 and notified by the transmitting station 10 (30).

(2.4) Monitoring Control Apparatus 50

The monitoring control apparatus (monitoring unit) 50 is an apparatus that monitors and controls the optical transmission apparatuses 10 and 30 serving as entities of the optical communication system. FIG. 1 illustrates the monitoring control apparatus 50 for the optical transmission apparatus 30, and the monitoring control apparatus 50 for the optical transmission apparatus 10 is omitted in FIG. 1.

The monitoring control apparatus 50 measures and determines a span loss of the optical transmission line 100 (200) based on monitor values obtained by the PDs 122 and 124 of the transmitting station 10 (30) and monitor values obtained by the PDs 130 and 132 of the receiving station 30 (10).

More specifically, a reference span loss is determined based on monitor values of ASE lights obtained by the PD 122 on the transmission side and the PD 132 on the reception side, and the fluctuation of the reference span loss can be determined based on monitor values of OAC signal light of the PD 124 on the transmission side and the PD 130 on the reception side.

Since the receiving station 30 (10) can be notified of monitor values of the PDs 122 and 124 of the transmitting station 10 (30) by using an OAC signal light as described above, the monitoring control apparatus 50 can acquire the monitor values from the receiving station 30 (10).

When the monitoring control apparatus 50 is an apparatus that can monitor and control both the optical transmission apparatuses 10 and 30, the monitor values can be independently and directly acquired from the optical transmission apparatuses 10 and 30, respectively.

The monitoring control apparatus 50 can also output information of the measured and determined span loss, alarm information about a fluctuation in span loss, and the like.

The function of the monitoring control apparatus 50 can also be incorporated as a function of the transmitting station 10 (30), for example, a function of the CPU 133.

(2.5) Span Loss Measuring Method

An example of a span loss measuring method in the optical communication system described above will be described below with reference to FIG. 3.

Figures 3A, 3B:
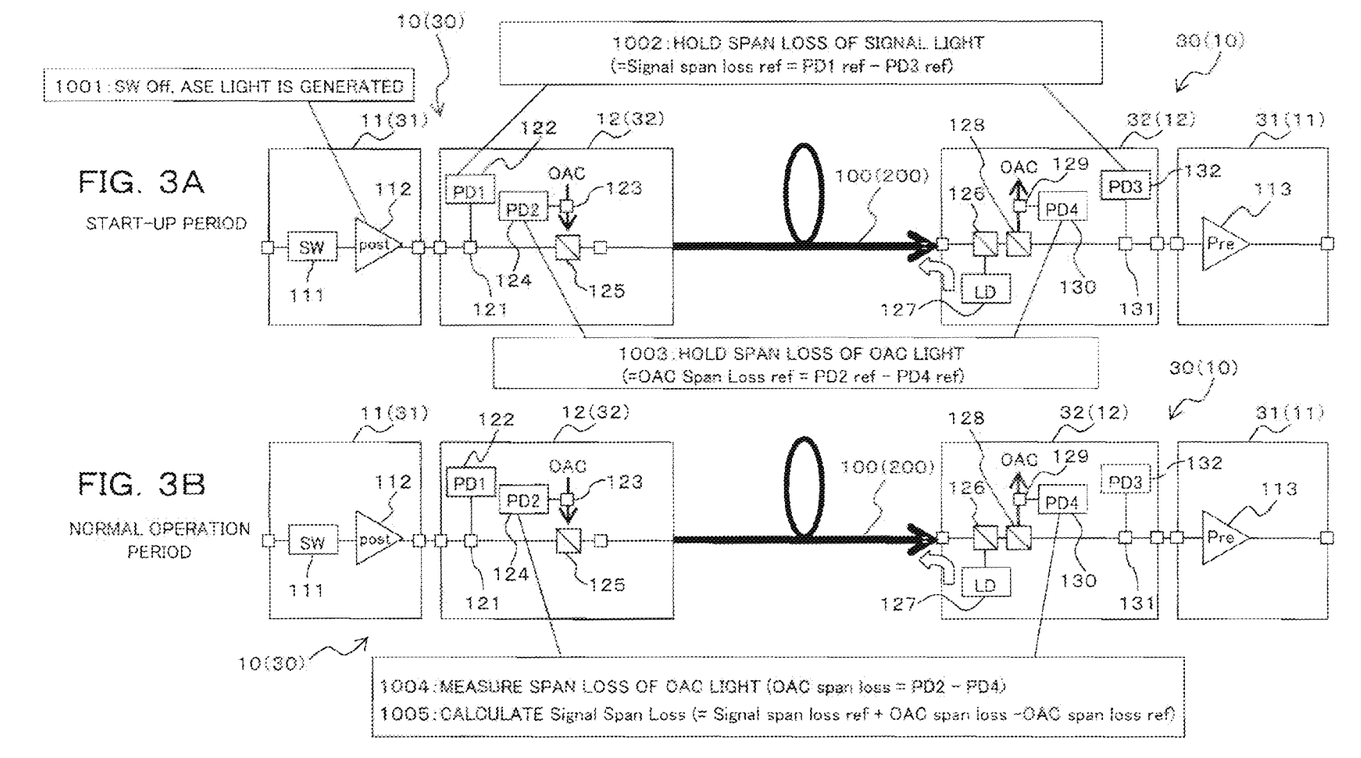
FIG. 3A is a diagram for explaining a span loss measuring method (start-up period) in the optical communication system depicted in FIG. 2.
FIG. 3B is a diagram for explaining a span loss measuring method (normal operation period) in the optical communication system depicted in FIG. 2.

(2.5.1) Start-up Period [FIG. 3A]

In the start-up period or the like, a reference span loss of the optical transmission line 100 (200) is measured by using an ASE light.

The receiving station 30 (10) transmits a request of a span loss measuring mode, DRA information, and the like to the transmitting station 10 (30) by using a facing-side OAC signal light headed toward the transmitting station 10 (30). The receiving station 30 (10) halts drive of a DRA (Raman pumping light source 127) for the optical transmission line 100 (200).

The transmitting station 10 (30) communicates information received by the OAC signal light from the CPU 133 of the DRA module 12 (32) to the CPU 114 of the EDFA module 11 (31).

When the CPU 114 recognizes the request of the span loss measuring mode from the receiving station 30 (10), the CPU 114 controls and sets the optical switch unit 111 in an OFF state. The CPU 114 controls (sets) the post-amplifier 112 to a high-output mode. At this time, the CPU 114 determines an output light power (pumping light power) of the post-amplifier 112 based on the DRA information. For example, the CPU 114 controls an output light power (pumping light power) from the post-amplifier 112 to a power at which the receiving station 30 (10) can monitor a receiving light power of an ASE light even when a Raman gain is not substantially present in the optical transmission line 100 (200). In this manner, an ASE light having an output power level which make it possible to perform span loss measurement based on the ASE light is output from the post-amplifier 112 [Process 1001 in FIG. 3A].

In the DRA module 12 (32), the CPU 133 acquires a monitor value (PD1ref) of an ASE light output power level obtained by the PD 122, and the monitor value is transmitted to the receiving station 30 (10) through the optical transmission line 100 (200) by using an OAC signal addressed to the receiving station 30 (10).

In the receiving station 30 (10), the CPU 133 of the DRA module 32 (12) acquires the monitor value (PD1ref) notified by the OAC signal and a monitor value (PD3ref) of an input power level of a receiving ASE light obtained by the PD 132. The CPU 133 notifies the monitoring control apparatus 50 of the acquired monitor values.

The monitoring control apparatus 50 determines a reference span loss (signal span loss reference) based on an ASE light based on the notified monitor values. More specifically, the monitoring control apparatus 50 determines an ASE reference span loss by the following equation (1).

$$\text{ASE reference span loss} = PD1\text{ref} - PD3\text{ref} \qquad (1)$$

Since the ASE reference span loss is measured while the DRA is halted, it can be said that the ASE reference span loss is a span loss that is not influenced by a Raman gain and that is accurately matched with an actual span loss.

The monitoring control apparatus 50 holds the determined ASE reference span loss in a memory or the like (not illustrated) [Process 1002 in FIG. 3A]

On the other hand, in the transmitting station 10 (30), in order to measure a span loss serving as a reference of a fluctuation with respect to the ASE reference span loss by using an OAC signal light, the OAC signal light is also transmitted. At this time, since the OSC signal light tends to have a transmission distance longer than that of a light in a signal light wavelength band, the DRA (Raman pumping light source 127) of the receiving station 30 (10) needs not be driven. When measurement in the receiving station 30 (10) may be difficult unless the DRA is driven, the DRA of the receiving station 30 (10) can be driven.

In the DRA module 12 (32) of the transmitting station 10 (30), the CPU 133 acquires a monitor value (PD2ref) at a transmitting OAC light power level obtained by the PD 124 and transmits the monitor value (PD2ref) to the receiving station 30 (10) through the optical transmission line 100 (200) by using the OAC signal addressed to the receiving station 30 (10). The monitor value (PD2ref) may be transmitted together with the monitor value (PD1ref) at the ASE light output power level or independently transmitted.

In the receiving station 30, the CPU 133 of the DRA module 32 (12) acquires the monitor value (PD2ref) notified by the OAC signal and a monitor value (PD4ref) at a receiving OAC signal optical power level obtained by the PD 130. The CPU 133 notifies the monitoring control apparatus 50 of the acquired monitor values.

The monitoring control apparatus 50 determines a reference span loss (OAC span loss reference) of an OAC reference based on the notified monitor values. More specifically, the monitoring control apparatus 50 determines an OAC reference span loss by the following equation (2).

$$\text{OAC reference span loss} = PD2\text{ref} - PD4\text{ref} \qquad (2)$$

The monitoring control apparatus 50 holds the determined OAC reference span loss in the memory or the like [Process 1003 in FIG. 3A].

With the above process, the ASE reference span loss and the OAC reference span loss are held and managed in the monitoring control apparatus 50.

(2.5.2) Normal Operation Period [FIG. 3B]

When the system shifts to a normal operation, the transmitting station 10 (30) controls the optical switch unit 111 to an ON state by an instruction from the CPU 114, and controls a pumping light power (gain) of the post-amplifier 112 to set an output light level (mode) to a level in the normal operation period (mode).

The transmitting station 10 (30) and the receiving station 30 (10) measure a fluctuation in span loss by using an OAC signal light. The normal operation period includes a state in which the number of signal lights transmitted in a signal light wavelength band is 0 (this applies also in the following description).

In the transmitting station 10 (30), the CPU 133 of the DRA module 12 (32) acquires a monitor value (PD2) at a transmitting OAC light power level obtained by the PD 124 and transmits the monitor value to the receiving station 30 (10) through the optical transmission line 100 (200) by using an OAC signal light addressed to the receiving station 30 (10).

In the receiving station 30, the CPU 133 of the DRA module 32 (12) acquires the monitor value (PD2) notified by the OAC signal and a monitor value (PD4) at a receiving OAC signal light power level obtained by the PD 130. The CPU 133 notifies the monitoring control apparatus 50 of the acquired monitor values.

The monitoring control apparatus 50 determines a span loss using an OAC signal light based on the notified monitor values. More specifically, the monitoring control apparatus 50 determines an OAC span loss by the following equation (3) [Process 1004 in FIG. 3B].

$$\text{OAC span loss} = PD2 - PD4 \qquad (3)$$

The monitoring control apparatus 50 determines a difference (fluctuation) between the held OAC reference span loss and the determined OAC span loss. In this embodiment, since the fluctuation in span loss is measured by using an OAC in a wavelength band which is not influenced by a Raman gain, an accurate fluctuation can be measured even in a state in which the DRA is activated.

The monitoring control apparatus 50 adds the determined difference to the ASE reference span loss as described in the following equation (4) to determine a span loss corresponding to a central wavelength in a signal light wavelength band in a normal operation [Process 1005 in FIG. 3B].

$$\text{Span loss} = \text{ASE reference span loss} + (\text{OAC span loss} - \text{OAC reference span loss}) \qquad (4)$$

The signal light wavelength band ranges, for example, from 1530 nm to 1560 nm, and the central wavelength in the signal light wavelength band ranges, for example, from 1545 nm to 1550 nm (this applies also in the following description).

The monitoring control apparatus 50, as needed, outputs a span loss determined by the equation (4), alarm information about the fluctuation in span loss, and the like.

As described above, according to the embodiment, since an ASE light is transmitted from the post-amplifier 112 of the transmitting station 10 (30) to the receiving station 30 (10) in a high-output mode while the DRA is halted, in the receiving station 30 (10), a receiving light level of the ASE light can be accurately measured without being influenced by the Raman gain. Therefore, a span loss (ASE) serving as a reference about the central wavelength in the signal light wavelength band can be accurately measured.

By using an OAC signal light serving as an example of a light having a wavelength band which is not influenced by a Raman gain, an OAC reference span loss obtained before a normal operation and a fluctuation in a normal operation are measured, and a reference span loss corresponding to the central wavelength can be corrected appropriately based on measurement results. Therefore, also in the normal operation, a more accurate span loss can be measured, and the number of operation wavelengths caused by wavelength dependency of the span loss and a measurement error occurring with a change of a wavelength arrangement can be decreased as much as possible.

[3] Second Embodiment

A light used to measure a reference span loss is not limited to an ASE light as in the first embodiment. For example, in place of the ASE light, a signal light having a wavelength (central wavelength) at which a loss of the optical transmission line 100 (200) is defined may be used, or a signal light generated by a variable-wavelength light source and having an arbitrary wavelength may be used.

Figure 4A:
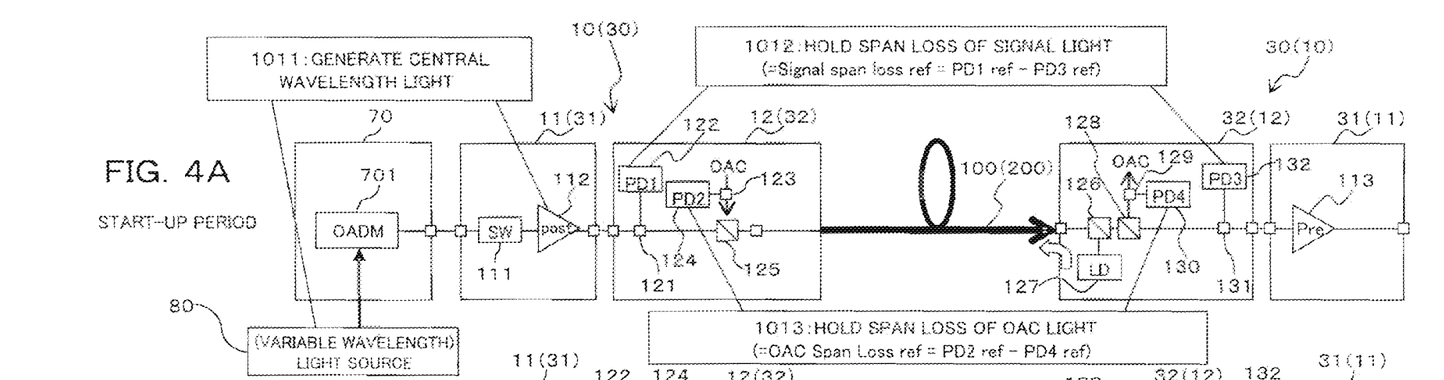
FIG. 4A is a diagram for explaining a span loss measuring method (start-up period) in an optical communication system according to a second embodiment.
Figure 4B:
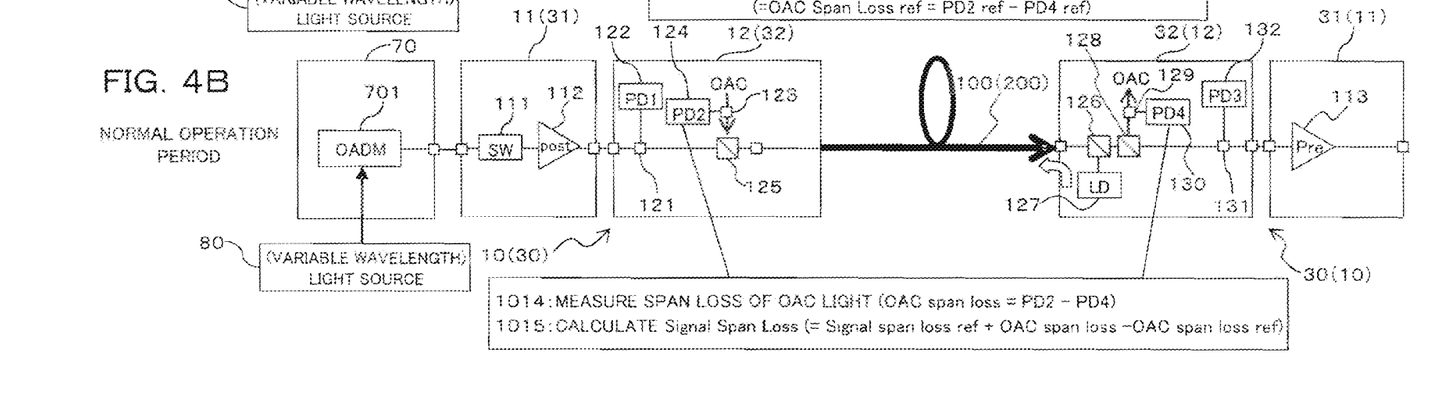
FIG. 4B is a diagram for explaining a span loss measuring method in the optical communication system according to the second embodiment.

FIG. 4 illustrates an example using a variable-wavelength light source. FIG. 4 shows a configuration in which a signal light generated by a variable-wavelength light source 80 and having an arbitrary wavelength is input to an OADM unit 701 of an optical add-drop multiplexer (OADM) 70 and input from the OADM unit 701 to the above-described optical switch unit 111 (post-amplifier 112).

According to the configuration, a wavelength (central wavelength) used in measurement of a reference span loss can be arbitrarily changed. When the optical switch unit 111 is controlled and set by the CPU 114 in a high-output mode in an ON state, an input light power to the post-amplifier 112 increases. Therefore, in comparison with the case in which a light is emitted while the post-amplifier 112 receives no input as described in the first embodiment, a pumping light power required in the high-output mode can be reduced.

Span loss measurement in the embodiment will be described below.

(3.1) Start-up Period [FIG. 4A]

Even in the embodiment, in a start-up period or the like, the receiving station 30 (10) uses an opposing OAC signal light headed toward the transmitting station 10 (30) to transmit a span loss measuring mode request, DRA information, and the like to the transmitting station 10 (30). The receiving station 30 (10) halts the DRA (Raman pumping light source 127).

The transmitting station 10 (30) communicates information received by the OAC signal light from the CPU 133 of the DRA module 12 (32) to the CPU 114 of the EDFA module 11 (31). The CPU 114 ON-controls the optical switch unit 111 by recognizing the span loss measuring mode request.

The CPU 114, for example, determines a gain of the post-amplifier 112 based on the DRA information and information about a power level of a signal light generated by the variable-wavelength light source 80, and controls a pumping light power for the post-amplifier 112 based on the determination. The information about the power level of the signal light generated by the variable-wavelength light source 80 can be acquired by, for example, inter-CPU communication with a CPU (not shown) in the OADM 70.

Accordingly, the post-amplifier 112 transmits a signal light corresponding to one wavelength of an output power level according to the determined gain [Process 1011 in FIG. 4A].

The CPU 133 of the DRA module 12 (32) acquires the monitor value (PD1ref) at the transmitting signal light output power level obtained by the PD 122 and transmits the monitor value (PD1ref) to the receiving station 30 (10) through the optical transmission line 100 (200) by using an OAC signal addressed to the receiving station 30 (10).

In the receiving station 30, the CPU 133 of the DRA module 32 (12) acquires the monitor value (PD1ref) notified by the OAC signal and the monitor value (PD3ref) at the input power level of the receiving signal light obtained by the PD 132. The CPU 133 notifies the monitoring control apparatus 50 of the acquired monitor values.

The monitoring control apparatus 50 determines a reference span loss (signal span loss reference) based on a signal light of one wavelength (central wavelength in a signal light wavelength band) based on the notified monitor values. More specifically, the monitoring control apparatus 50 determines a signal light reference span loss by the following equation (5).

$$\text{Signal light reference span loss} = PD1\text{ref} - PD3\text{ref} \quad (5)$$

Since the signal light reference span loss is also measured while the DRA is halted, it can be said that the signal light reference span loss is a span loss that is not influenced by a Raman gain and that is accurately matched with an actual span loss.

The monitoring control apparatus 50 holds the determined signal light reference span loss in the above-described memory or the like [Process 1012 in FIG. 4A].

In the transmitting station 10 (30), as in the embodiment, in order to measure an OAC reference span loss, an OAC signal light is also transmitted. At this time, the receiving station 30 (10) drives the DRA (Raman pumping light source 127) to the optical transmission line 100 (200) subjected to span loss measurement as described above.

In the transmitting station 10 (30), the CPU 133 in the DRA module 12 (32) acquires the monitor value (PD2ref) at a transmitting OAC light power level obtained by the PD 124. The CPU 133 transmits the acquired monitor value (PD2ref) to the receiving station 30 (10) through the optical transmission line 100 (200) by using the OAC signal addressed to the receiving station 30 (10). The monitor value (PD2ref) may be transmitted together with the monitor value (PD1ref) at the signal light output power level or independently transmitted.

In the receiving station 30 (10), the CPU 133 of the DRA module 32 (12) acquires the monitor value (PD2ref) notified by the OAC signal and a monitor value (PD4ref) at a receiving OAC signal optical power level obtained by the PD 130. The CPU 133 notifies the monitoring control apparatus 50 of the acquired monitor values.

The monitoring control apparatus 50 determines a reference span loss (OAC span loss reference) of an OAC reference by the equation (2) described above based on the notified monitor values.

The monitoring control apparatus 50 holds the determined OAC reference span loss in the memory or the like [Process 1013 in FIG. 4A].

With the above process, the signal light reference span loss and the OAC reference span loss are held and managed in the monitoring control apparatus 50.

(3.2) Normal Operation Period [FIG. 4B]

When the system shifts to a normal operation, the transmitting station 10 (30) and the receiving station 30 (10) measure a fluctuation in span loss by using the OAC signal light as in the embodiment described above. In the transmitting station 10 (30), the optical switch unit 111 is set in an ON state.

In the transmitting station 10 (30), the CPU 133 of the DRA module 12 (32) acquires a monitor value (PD2) at a transmitting OAC light power level obtained by the PD 124 and transmits the monitor value to the receiving station 30 (10) by using an OAC signal addressed to the receiving station 30 (10).

In the receiving station 30 (10), the CPU 133 of the DRA module 32 (12) acquires the monitor value (PD2) notified by the OAC signal and a monitor value (PD4) at a receiving OAC signal light power level obtained by the PD 130. The CPU 133 notifies the monitoring control apparatus 50 of the acquired monitor values.

The monitoring control apparatus 50 determines an OAC span loss by the equation (3) based on the notified monitor values [Process 1014 in FIG. 4B].

The monitoring control apparatus 50 determines a difference (fluctuation) between the held OAC reference span loss and the determined OAC span loss. In this embodiment, since the fluctuation in span loss is measured by using an OAC in a wavelength band which is not influenced by a Raman gain, an accurate fluctuation can be measured even in a state in which the DRA is activated.

The monitoring control apparatus 50 adds the determined difference to the signal light reference span loss as described in the following equation (6) to determine a span loss corresponding to a central wavelength in a signal light wavelength band in a normal operation [Process 1015 in FIG. 4B].

Span loss=signal light reference span loss+(OAC span loss−OAC reference span loss)　　(6)

The monitoring control apparatus 50, as needed, outputs a span loss determined by the equation (6), alarm information about the fluctuation in span loss, and the like.

[4] Third Embodiment

As a high-output mode setting of the post-amplifier 112 in reference span loss measurement, not only a method of raising an output light power level (pumping light power) of the post-amplifier 112 but also a method of raising an input light power to the post-amplifier 112 may be used. Depending on the control and the configuration of the post-amplifier 112, the latter method may be advantageous.

Figure 5A:
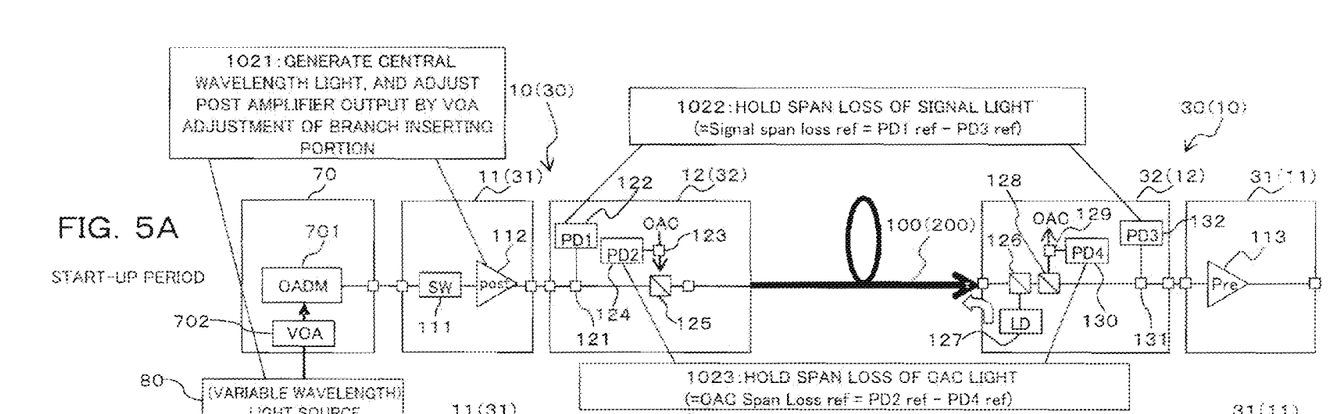
FIG. 5A is a diagram for explaining a span loss measuring method (start-up period) in an optical communication system according to a third embodiment.
Figure 5B:
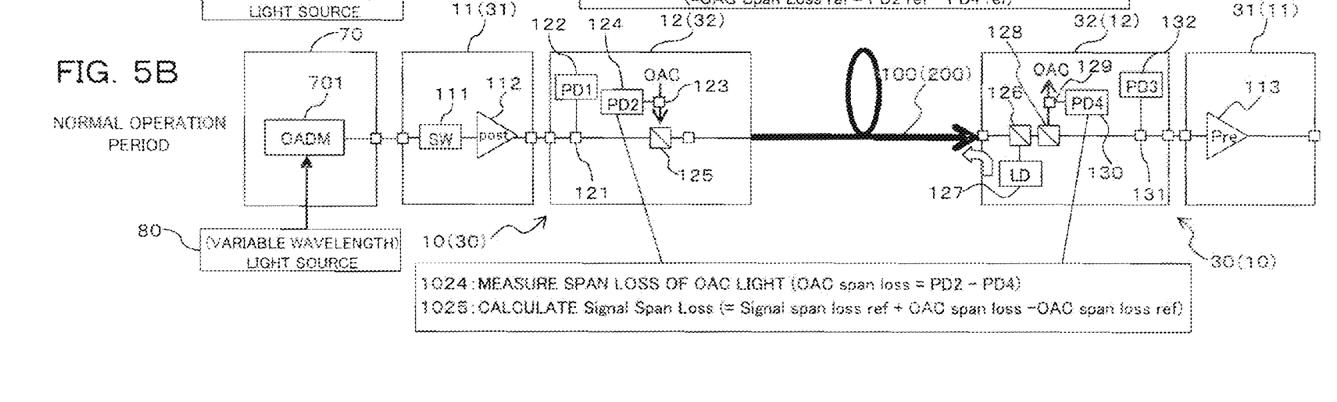
FIG. 5B is a diagram for explaining a span loss measuring method (normal operation period) in the optical communication system according to the third embodiment.

The example is illustrated in FIG. 5. FIG. 5 corresponds to a configuration in which, in the second embodiment (FIG. 4), a variable optical attenuator (VOA) 702 which adjusts an output power level of the variable-wavelength light source 80 is arranged between the OADM unit 701 and the variable-wavelength light source 80. In this configuration, in a span loss measuring mode (high-output mode setting), an amount of attenuation of the variable optical attenuator (VOA) 702 is controlled to decrease, so that an input light power level to the post-amplifier 112 can be raised.

In this case, an amount of attenuation of the VOA 702 is determined and controlled by, for example, a CPU (not illustrated) in the OADM 70. For this reason, DRA information notified by the receiving station 30 (10) is preferably communicated from the CPU 114 of the EDFA module 11 (31) to the CPU in the OADM 70. The CPU 114 may control the amount of attenuation of the variable optical attenuator (VOA) 702.

Span loss measurement in the embodiment will be described below.

(4.1) Start-up Period [FIG. 5A]

Also in the embodiment, in a start-up period or the like, the receiving station 30 (10) transmits a span loss measurement mode request, DRA information, and the like to the transmitting station 10 (30) by using a facing-side OAC signal light headed toward the transmitting station 10 (30). The receiving station 30 (10) halts the DRA to the optical transmission line 100 (200) to be measured.

In the transmitting station 10 (30), the CPU 133 of the DRA module 12 (32) communicates information received by the OAC signal light to the CPU 114 of the EDFA module 11 (31). The CPU 114 ON-controls the optical switch unit 111 by recognizing the span loss measuring mode request.

The CPU 114 notifies the CPU in the OADM 70 of the DRA information. The CPU in the OADM 70 determines an output light power level of the post-amplifier 112 based on the notified DRA information, and controls an amount of attenuation of the VOA 702 according to the output power level.

Accordingly, the post-amplifier 112 transmits a signal light corresponding to one wavelength of an output power level according to control of an amount of attenuation of the VOA 702 [Process 1021 in FIG. 5A].

The CPU 133 of the DRA module 12 (32) acquires the monitor value (PD1ref) at the transmitting signal light output power level obtained by the PD 122 and transmits the monitor value (PD1ref) to the receiving station 30 (10) through the optical transmission line 100 (200) by using an OAC signal addressed to the receiving station 30 (10).

In the receiving station 30 (10), the CPU 133 of the DRA module 32 (12) acquires the monitor value (PD1ref) notified by the OAC signal and the monitor value (PD3ref) at the input power level of the receiving signal light obtained by the PD 132. The CPU 133 notifies the monitoring control apparatus 50 of the acquired monitor values.

The monitoring control apparatus 50 determines a reference span loss (signal span loss reference) based on a signal light of one wavelength (central wavelength in a signal light wavelength band) by the equation (5) based on the notified monitor values.

Since the signal light reference span loss is also measured while the DRA is halted, it can be said that the signal light reference span loss is a span loss that is not influenced by a Raman gain and that is accurately matched with an actual span loss.

The monitoring control apparatus 50 holds the determined signal light reference span loss in the above-described memory or the like [Process 1022 in FIG. 5A].

In the transmitting station 10 (30), as in the embodiment described above, in order to measure an OAC reference span loss, an OAC signal light is also transmitted. At this time, the receiving station 30 (10) drives the DRA as needed.

In the transmitting station 30 (10), the CPU 133 in the DRA module 12 (32) acquires the monitor value (PD2ref) at a transmitting OAC light power level obtained by the PD 124. The CPU 133 transmits the acquired monitor value (PD2ref) to the receiving station 30 (10) through the optical transmission line 100 (200) by using the OAC signal addressed to the receiving station 30 (10). The monitor value (PD2ref) may be transmitted together with the monitor value (PD1ref) at the signal light output power level or independently transmitted.

In the receiving station 30 (10), the CPU 133 of the DRA module 32 (12) acquires the monitor value (PD2ref) notified by the OAC signal and a monitor value (PD4ref) at a receiving OAC signal optical power level obtained by the PD 130. The CPU 133 notifies the monitoring control apparatus 50 of the acquired monitor values.

The monitoring control apparatus 50 determines a reference span loss (OAC span loss reference) of an OAC reference by the equation (2) described above based on the notified monitor values.

The monitoring control apparatus 50 holds the determined OAC reference span loss in the memory or the like [Process 1023 in FIG. 5A].

With the above process, the signal light reference span loss and the OAC reference span loss are held and managed in the monitoring control apparatus 50.

(4.2) Normal Operation Period [FIG. 5B]

When the system shifts to a normal operation, the receiving station 30 (10) controls the Raman pumping light source 127 for the optical transmission line 100 (200) to an ON state by an instruction from, for example, the CPU 133 and activates the DRA. In the transmitting station 10 (30), the optical switch unit 111 is kept in an ON state. The OADM 70 sets an amount of attenuation of the VOA 702 to an amount of attenuation in the normal operation state. This is indicated in FIG. 5B by not illustrating the VOA 702.

The transmitting station 10 (30) and the receiving station 30 (10) measure fluctuations in span loss by using an OAC signal light as in the first and second embodiments.

More specifically, in the transmitting station 10 (30), the CPU 133 of the DRA module 12 (32) acquires a monitor value (PD2) at a transmitting OAC light power level obtained by the PD 124 and transmits the monitor value to the receiving station 30 (10) by using an OAC signal addressed to the receiving station 30 (10) through the optical transmission line 100 (200).

In the receiving station 30 (10), the CPU 133 of the DRA module 32 (12) acquires the monitor value (PD2) notified by the OAC signal and a monitor value (PD4) at a receiving OAC signal light power level obtained by the PD 130. The CPU 133 notifies the monitoring control apparatus 50 of the acquired monitor values.

The monitoring control apparatus 50 determines a fluctuation in OAC span loss by the equation (3) based on the notified monitor values [Process 1024 in FIG. 5B]. Also in the embodiment, since the fluctuation is measured by using an OAC in a wavelength band which is not influenced by a Raman gain, an accurate fluctuation can be measured even in a normal operation state after the DRA is activated.

The monitoring control apparatus 50 determines a difference (fluctuation) between the held OAC reference span loss and the determined OAC span loss and adds the difference to the signal light reference span loss by the equation (6). In this manner, a span loss corresponding to a central wavelength in a signal wavelength band in the normal operation state is determined [Process 1025 in FIG. 5B].

The monitoring control apparatus 50, as needed, outputs the span loss determined by the equation (6), alarm information about the fluctuation in span loss, and the like.

[5] Fourth Embodiment

In a high-output mode setting in reference span loss measurement, as another unit operable to raise an output light power level of the post-amplifier 112, a pumping light source for the post-amplifier 112 may be added. An example of the pumping light source is illustrated in FIG. 6.

Figures 6A, 6B:
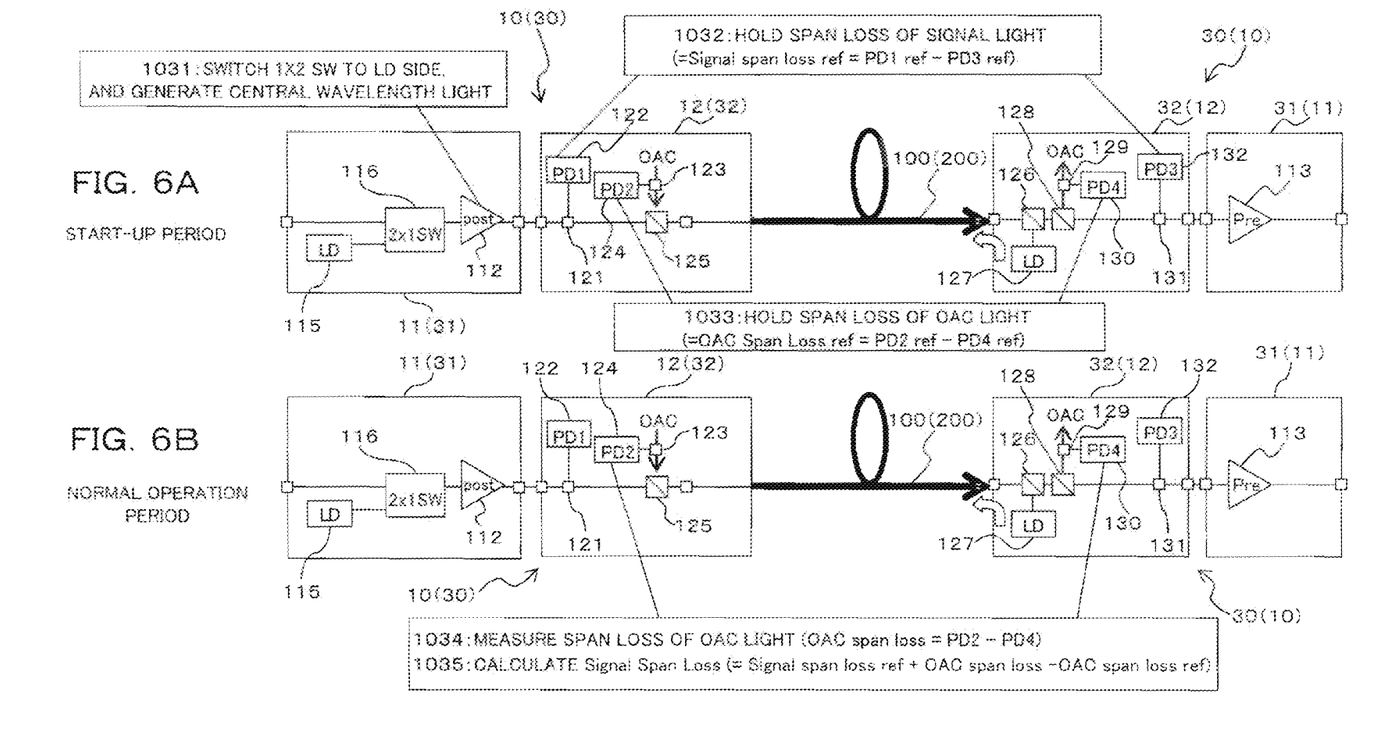
FIG. 6A is a diagram for explaining a span loss measuring method (start-up period) in an optical communication system according to a fourth embodiment.
FIG. 6B is a diagram for explaining a span loss measuring method (normal operation period) in the optical communication system according to the fourth embodiment.

In FIG. 6, in the EDFA module 11 (31) of the transmitting station 10 (30), in place of the optical switch unit 111, a 2-input 1-output (2×1) optical switch unit 116 is arranged. Furthermore, a pumping light source 115 that generates a pumping light having a central wavelength in a signal wavelength band or a wavelength approximate to the central wavelength is arranged. The pumping light source 115 is, for example, a laser diode (LD).

A pumping light generated by the pumping light source 115 is input to one input port of the 2×1 optical switch unit 116. A main signal light input to the post-amplifier 112 in a normal operation is input to the other input port of the 2×1 optical switch unit 116.

The CPU 114 drives the pumping light source 115 and switches an input of the optical switch unit 116 to the pumping light source 115 side in a high-output mode setting in reference span loss measurement. In this manner, the pumping light from the pumping light source 115 is additionally input to the post-amplifier 112 to increase a pumping light power, so that an output light power level of an ASE light from the post-amplifier 112 can be increased. Two or more pumping light sources 115 can also be added.

In this manner, in order to operate the post-amplifier 112 in a high-output mode, it may be advantageous in terms of cost to arrange a plurality of inexpensive pumping light sources.

Span loss measurement in the embodiment will be described below.

(5.1) Start-up Period [FIG. 6A]

Also in the embodiment, in a start-up period or the like, the receiving station 30 (10) uses an opposing OAC signal light headed toward the transmitting station 10 (30) to transmit a span loss measuring mode request, DRA information, and the like to the transmitting station 10 (30). The receiving station 30 (10) halts the DRA to the optical transmission line 100 (200) to be measured.

The transmitting station 10 (30) communicates information received by the OAC signal light from the CPU 133 of the DRA module 12 (32) to the CPU 114 of the EDFA module 11 (31). The CPU 114 sets an input of the 2×1 optical switch unit 116 to the pumping light source 115 side by recognizing the span loss measuring mode request.

The CPU 114, as in the first embodiment, determines an output power level of an ASE light corresponding to a central wavelength in a signal light wavelength band based on the DRA information and controls a pumping light power (including a pumping light power of the pumping light source 115) for the post-amplifier 112 based on the determination. In this manner, the ASE light at the determined output power level is transmitted from the post-amplifier 112 [Process 1031 in FIG. 6A].

The CPU 133 of the DRA module 12 (32) acquires the monitor value (PD1ref) at the transmitting signal light output power level obtained by the PD 122 and transmits the monitor value (PD1ref) to the receiving station 30 (10) through the optical transmission line 100 (200) by using an OAC signal addressed to the receiving station 30 (10).

In the receiving station 30 (10), the CPU 133 of the DRA module 32 (12) acquires the monitor value (PD1ref) notified by the OAC signal and the monitor value (PD3ref) at the input power level of the receiving signal light obtained by the PD 132. The CPU 133 notifies the monitoring control apparatus 50 of the acquired monitor values.

The monitoring control apparatus 50 determines a difference between the notified monitor values, i.e., an ASE reference span loss (signal span loss reference).

Since the signal light reference span loss is measured while the DRA is halted, it can be said that the signal light reference span loss is a span loss that is not influenced by a Raman gain and that is accurately matched with an actual span loss.

The monitoring control apparatus 50 holds the determined signal light reference span loss in the above-described memory or the like [Process 1032 in FIG. 6A].

In the transmitting station 10 (30), as in the embodiment, in order to measure an OAC reference span loss, an OAC signal light is also transmitted. At this time, as described above, the receiving station 30 (10) drives the DRA (Raman pumping light source 127) as needed.

In the transmitting station 10 (30), the CPU 133 in the DRA module 12 (32) acquires the monitor value (PD2ref) at a transmitting OAC light power level obtained by the PD 124. The CPU 133 transmits the acquired monitor value (PD2ref) to the receiving station 30 (10) through the optical transmission line 100 (200) by using the OAC signal addressed to the receiving station 30 (10). The monitor value (PD2ref) may be transmitted together with the monitor value (PD1ref) at the signal light output power level or independently transmitted.

In the receiving station 30, the CPU 133 of the DRA module 32 (12) acquires the monitor value (PD2ref) notified by the OAC signal and a monitor value (PD4ref) at a receiving OAC signal optical power level obtained by the PD 130. The CPU 133 notifies the monitoring control apparatus 50 of the acquired monitor values.

The monitoring control apparatus 50 determines a difference between the notified monitor values, i.e., an OAC reference span loss (OAC span loss reference).

The monitoring control apparatus 50 holds the determined OAC reference span loss in the memory or the like [Process 1033 in FIG. 6A].

With the above process, the ASE reference span loss and the OAC reference span loss are held and managed in the monitoring control apparatus 50.

(5.2) Normal Operation Period [FIG. 6B]

When the system shifts to a normal operation, in the transmitting station 10 (30), the CPU 114 of the EDFA module 11 (31) switches an input of the 2×1 optical switch unit 116 to the main signal light side.

The transmitting station 10 (30) and the receiving station 30 (10) measure fluctuations in span loss by using an OAC signal light as in the embodiments.

More specifically, in the transmitting station 10 (30), the CPU 133 of the DRA module 12 (32) acquires a monitor value (PD2) at a transmitting OAC light power level obtained by the PD 124 and transmits the monitor value to the receiving station 30 (10) by using an OAC signal addressed to the receiving station 30 (10).

In the receiving station 30 (10), the CPU 133 of the DRA module 32 (12) acquires the monitor value (PD2) notified by the OAC signal and a monitor value (PD4) at a receiving OAC signal light power level obtained by the PD 130. The CPU 133 notifies the monitoring control apparatus 50 of the acquired monitor values.

The monitoring control apparatus 50 determines an OAC span loss by the equation (3) based on the notified monitor values [Process 1034 in FIG. 6B].

The monitoring control apparatus 50 determines a difference (fluctuation) between the held OAC reference span loss and the determined OAC span loss. In this embodiment, since the fluctuation in span loss is measured by using an OAC in a wavelength band which is not influenced by a Raman gain, an accurate fluctuation can be measured even in a normal operation after the DRA is activated.

The monitoring control apparatus 50 adds the determined difference to the signal light reference span loss to determine a span loss corresponding to a central wavelength in a signal light wavelength band in a normal operation [Process 1035 in FIG. 6B].

The monitoring control apparatus 50, as needed, outputs the determined span loss, alarm information about the fluctuation in span loss, and the like.

[6] Other

In embodiments including the above first to fourth embodiments, a span loss measuring method in a backward pumping configuration that brings a Raman pumping light from an output side of the optical transmission line 100 (200) is exemplified. However, even in a forward pumping configuration or a bidirectional pumping configuration, span loss measurement can be performed by the same method as that in the embodiments described above. More specifically, when a reference span loss is to be measured, a DRA is halted, and a transmitting light power of a light used in measurement may be controlled to increase according to a decrease in a Raman gain caused by the halt.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An optical communication system comprising:
   a Raman amplifier that gives a Raman gain to an optical transmission line;
   a transmitter that transmits to the optical transmission line, a first light being subject to receive the Raman gain through the optical transmission line and a second light not being subject to receive the Raman gain through the optical transmission line;
   a controller that halts the Raman amplifier and controls a transmission light power of the first light so as to increase the power according to the Raman gain;
   a first measuring instrument that measures a first input-output light power for the first light of the optical transmission line, the first input-output light power being used for determining a reference of loss characteristic of the optical transmission line, during the Raman amplifier being halted; and
   a second measuring instrument that measures a second input-output light power for the second light of the optical transmission line, the second input-output light power being used for determining a fluctuation of the reference.

2. The optical communication system according to claim 1, further comprising a monitor that monitors the loss characteristic of the optical transmission line based on measurement results obtained by the first and second measuring instruments.

3. The optical communication system according to claim 1, wherein
   the first light is a light in a band including a central wavelength of a signal light wavelength band on the optical transmission line, and
   the second light is a light in a band having a wavelength longer than that of the signal light wavelength band.

4. The optical communication system according to claim 3, wherein the first light is a spontaneous emitting light output from the optical amplifier without inputting a signal light to the optical amplifier.

5. The optical communication system according to claim 3, wherein the first light is a signal light having any one of a central wavelength of a signal light wavelength band on the optical transmission line and a wavelength approximate to the central wavelength.

6. The optical communication system according to claim 3, wherein the light in the band having the long wavelength is a light having a wavelength used for transmitting information about the Raman gain.

7. A method of measuring an optical transmission line in an optical communication system having a Raman amplifier that gives a Raman gain to an optical transmission line, the method comprising:
- transmitting to the optical transmission line, a first light being subject to receive the Raman gain through the optical transmission line and a second light not being subject to receive the Raman gain through the optical transmission line;
- halting the Raman amplifier and controlling a transmission light power of the first light so as to increase the power according to the Raman gain;
- measuring a first input-output light power for the first light of the optical transmission line, the first input-output light power being used for determining a reference of loss characteristic of the optical transmission line, during the Raman amplifier being halted; and
- measuring a second input-output light power for the second light of the optical transmission line, the second input-output light power being used for determining a fluctuation of the reference.

8. The method according to claim 7, further comprising monitoring the loss characteristic of the optical transmission line based on results of each of the measurements.

9. A transmitting station in an optical communication system that transmits a light from an optical transmitting apparatus serving as the transmitting station to an optical transmission apparatus serving as a receiving station through an optical transmission line, the transmitting station comprising:
- a transmitter that transmits to the optical transmission line, a first light being subject to receive the Raman gain through the optical transmission line and a second light not being subject to receive the Raman gain through the optical transmission line;
- a controller that controls a transmission light power of the first light so as to increase the power according to the Raman gain with the Raman amplifier being controlled to halt;
- a first transmitted light measuring instrument that measures a first input light power for the first light of the optical transmission line, the first input light power being used for determining a reference of loss characteristic of the optical transmission line, during the Raman amplifier being halted; and
- a second transmitted light measuring instrument that measures a second input light power for the second light of the optical transmission line, the second input light power being used for determining a fluctuation of the reference.

10. The transmitting station according to claim 9, further comprising a notifying unit that notifies the receiving station of measurement results obtained by each of the transmitted light measuring instruments.

11. The transmitting station according to claim 9, wherein the controller determines whether the increase control is necessary based on information about the presence/absence of the Raman amplifier of the transmitting station or information about the presence/absence of the Raman amplifier, the information being notified from the receiving station.

12. The transmitting station according to claim 11, wherein the controller determines an amount of the increase control based on information about a Raman gain of the Raman amplifier of the transmitting station or information about a Raman gain of the Raman amplifier, the information being notified from the receiving station.

13. The transmitting station according to claim 9, wherein the increase control by the controller is control to increase a pumping light power for an optical amplifier that amplifies the first light.

14. The transmitting station according to claim 11, wherein the increase control by the controller is control to increase an input light power to an optical amplifier that amplifies the first light.

15. The transmitting station according to claim 13, wherein the control to increase the pumping light power is control to additionally input an output light from a light source that generates the first light to the optical amplifier as a pumping light for the optical amplifier that amplifies the first light.

16. A receiving station in an optical communication system that transmits a light from an optical transmitting apparatus serving as a transmitting station to an optical transmission apparatus serving as the receiving station through an optical transmission line, the receiving station comprising:
- a Raman amplifier that gives a Raman gain to the optical transmission line;
- a controller that controls the Raman amplifier to halt;
- a receiver that receives from the optical transmission line, a first light being subject to receive the Raman gain through the optical transmission line and a second light not being subject to receive the Raman gain through the optical transmission line;
- a first received light measuring instrument that measures a first output light power for the first light of the optical transmission line, the first output light power being used for determining a reference of loss characteristic of the optical transmission line, during the output light power of the first light being controlled so as to increase with the halt control and the Raman amplifier being halted; and
- a second received light measuring instrument that measures a second output light power for the second light of the optical transmission line, the second output light power being used for determining a fluctuation of the reference.

17. The receiving station according to claim 16, further comprising a measurement result notifying unit that notifies a monitoring apparatus that monitors loss characteristic of the optical transmission path of measurement results obtained by each of the received light measuring instruments.

18. The receiving station according to claim 17, wherein the measurement result notifying unit notifies the monitoring apparatus of the input light powers of the first light and the second light of the optical transmission line, the input light power being measured by the transmitting station and transmitted from the transmitting station.

* * * * *